United States Patent Office 3,219,590
Patented Nov. 23, 1965

3,219,590
BONDED MOLECULAR SIEVES
George L. Ribaud, Williamsville, N.Y., assignor to Union
Carbide Corporation, a corporation of New York
No Drawing. Filed Aug. 1, 1961, Ser. No. 128,359
12 Claims. (Cl. 252—430)

This invention relates to adsorbents of the molecular sieve type and more particularly to bonded molecular sieves of the zeolite family and a method for preparing the bonded materials, as for example in the form of pellets.

Zeolites are hydrated metal aluminosilicates having the general formula:

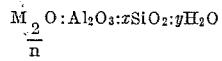

wherein "M" represents a metal, and "$n$" its valence. In general, a particular zeolite will have values for "$x$" and "$y$" that fall in a definite range.

Many of these zeolites are three-dimensional crystals. Activation of these crystalline zeolites by effecting the loss of the water of hydration leaves a crystalline structure interlaced with channels of molecular dimensions offering very high surface area for the adsorption of foreign molecules.

Adsorption is limited to molecules having size and shape such as to permit entrance through the pores to the inner sorption area, all other molecules being excluded. The common adsorbents such as charcoal and silica gel do not exhibit molecular sieve action.

Some of the zeolitic molecular sieves employed for this purpose, for example, chabazite, are found in nature and some of these as well as others may be synthesized. Certain synthetic molecular sieves which are not found in nature but which exhibit the desirable adsorptive properties are described in U.S. Patents Nos. 2,882,243 and 2,882,244 issued April 14, 1959, to R. M. Milton.

A prime difficulty encountered in effectively employing the adsorptive properties of these molecular sieves is attributable to their extremely fine particle size. The individual crystals commonly have diameters of from ½ to 30 microns in size. Large naturally-formed agglomerates of these crystals readily break up into smaller particles when handled. Crystals of this size are not too satisfactory for use in fixed beds such as are employed in fluid separations. This is true because fine particles cause a pressure drop through the bed that is prohibitively high. Additional difficulties are encountered when efforts are made to fluidize the small crystals. Under these circumstances it is desirable to agglomerate the crystals thereby providing masses which are more conveniently employed in conventional separation and adsorption equipment.

The agglomeration of molecular sieves presents several problems. Prime among these is the necessity of maintaining in large measure the adsorptive capacities and characteristics of the molecular sieves. Further difficulties are encountered with the alkalinity of the zeolites which tends to destroy or weaken many common types of binders. The regular uniform size of the crystals eliminates the interlocking surfaces that impart strength to many bonded objects. In the presence of water the molecular sieves dilate and thus resist compaction forces. Further, the use to which the bonded molecular sieves are to be put and their own peculiar characteristics often require cyclic heating to temperatures of between 350° C. and 650° C. to remove adsorbates from the molecular sieves.

It is the principal object of the present invention to provide an agglomerate of a molecular sieve and a binder which permits the more efficient use of the molecular sieve as an adsorbent. It is a further object of the invention to provide a bonded mass of molecular sieve such that the adsorptive properties of the molecular sieve are not materially affected. Still another object is to provide a bonded mass of molecular sieve exhibiting improved crush strength and attrition resistance. Other objects will be apparent from the disclosure and appended claims.

The objects of the invention are accomplished by binding a molecular sieve with a kaolinite-type clay and a lignosulfonate such that the bonded product will maintain its strength when heated repeatedly to temperatures in excess of 350° C. The clay should be semiplastic in the presence of water at atmospheric temperatures and capable of aquiring a substantial "green" strength upon exposure for short periods of time to the drying process of the air.

Lignosulfonates or lignin sulfonates are sulfonate salts obtained from the lignin or spent sulfite liquors in the paper making industry. Lignin sulfonates are more complex to prepare than the "alkali lignins" made from waste liquors of the sulfate and soda pulp processes. Although the nature of their structure is not fully established, the lignosulfonates are believed to be polymers or complexes built up from units having a benzene ring containing a methoxyl group, a phenolic group, and a 3-carbon side chain hydroxyl or other oxygen-containing groups. The basic or repeating unit of lignin sulfonic acid materials may therefore have the general structure:

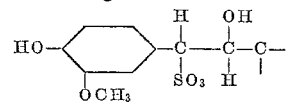

There is evidence that the polymers have an average molecular weight upwards of approximately 10,000. Examples of some commercially available lignin derivatives useful in the present invention are the following:

| Material: | Source |
| --- | --- |
| Orzan A, Orzan AH and Orzan S, Orzan P | Crown Zellerbach Paper Company. |
| Marasperse C, Marasperse CB, CE, B, CY, CK, Marasperse N, Maratan, Norlig | Marathon Corporation. |
| Toranil A, Toranil B | Lake States Yeast Corporation. |
| Polyfon F, H, O, R and T | W. Va. Pulp and Paper Company. |
| Lignox | Baroid Div., National Lead Company. |
| Palcotan | Pacific Lumber Company. |

According to the process of this invention, the bonded molecular sieves are prepared by blending or mixing a kaolin-type clay binder, a lignosulfonate and a molcular sieve, and fashioning the mixture into pellets or other suitable agglomerate forms. The pellets are in turn hardened by the setting of the binder. In a preferred practice the clay binder, lignosulfonate and molecular sieve and sufficient moisture to render the mixture pliant are blended together. The mixture is extruded through a die, broken into pellets, and the binder hardened by drying.

The amount of kaolin-type clay used in making the bonded materials of the invention depends upon the strength required in the final product and the degree of dilution of the molecular sieves permissible. For most purposes a clay content of from 5% to 35% by weight of the final pellet is satisfactory and good results have been obtained with a clay content of as little as 1% and as high as 40% by weight. A preferred range for most applications is from 10% to 25% of clay by weight of pellet.

The amount of lignosulfonate used in making the bonded materials of the invention based on the total weight of bone-dry zeolite and clay is between about 2 and 5% with a preferred concentration range of between about 2 and 4%. It has been discovered that at concentrations below about 2% there is no significant improvement in the crush strength of the bonded product over a bonded product of just zeolite and clay. At concentrations above about 5% it has been discovered that, although strong products are formed, a tendency toward reduced adsorption capacities for $CO_2$ is observed. To demonstrate the nature and effect of the lignosulfonate concentration, the following data are presented for a series of runs wherein sodium zeolite X powder was bonded with a kaolin clay and sodium lignosulfonate concentrations of from 0 to 5%.

LIGNOSULFONATE-STRENGTHENED ⅛ IN. KAOLIN CLAY-BONDED ZEOLITE X PELLETS

| Lignosulfonate concentration, percent [a] | Average activated crush strength, lb.[b] | Activated piece density, lb./ft.³ |
|---|---|---|
| 0 | 10.0 | 59 |
| 0.5 | 14.6 | 62 |
| 1 | 18.2 | 60 |
| 1.5 | 19.1 | 60 |
| 2 | 38.0 | 63 |
| 3 | 39.2 | 65 |
| 5 | 25.8 | 61 |

[a] Amount of lignosulfonate added is based on total weight of bone-dry solids in the mull, which contained 20 parts kaolin clay and 80 parts activated zeolite X powder.
[b] ⅛ in. pellets crushed on a diameter across ¼ in. wide anvil.

The pellets, however prepared, are fired in a kiln at elevated temperatures. Both rotary and stationary furnaces have been found satisfactory for this firing step. The pellets after firing are suitable for use in adsorption processes.

The maximum temperature for the firing process is the highest temperature at which the molecular sieve is structurally stable. This is generally below about 700° C. In addition, a dry purge gas should be passed through the furnace during the firing operation to minimize the loss of adsorptive capacity of the molecular sieve.

The minimum temperature for firing the bonded molecular sieves is that temperature at which the clay will dry to give a bound product and at which the loss of the water of hydration of the molecular sieve will be effected. For best results, the clay-bonded molecular sieve should be fired at the temperature wherein the clay undergoes an irreversible phase change.

Irreversible phase change is defined herein as that state of the clay wherein it is fired sufficiently to irreversibly change its structure. Irreversible phase changes for kaolin clays are more thoroughly discussed in "Clay Mineralogy," by Grim, McGraw-Hill Book Company, 1953, pages 190–250. Kaolin-type clays pass through an irreversible phase change at about 600° C. This provides a product having maximum strength and attrition resistance. When the firing temperature is below the phase change temperature and the mixture only dried, the dried products are limited in use to those adsorption processes wherein continuous recycling and regenerating are unnecessary. However, the molecular sieve in the dried products retains its adsorption characteristics substantially unimpaired.

The kaolin-type clays or clay minerals contemplated in the practice of this invention include kaolin, kaolinite, halloysite, endellite and dickite; commercially, kaolin-type clays bear such names as "ball clay," "Avery clay" and "china clay." Kaolin-type clays have the approximate general composition $$Al_2O_3 \cdot zSiO_2 \cdot 2\text{-}4H_2O$$

wherein $z$ may vary between about 1.8 and 2.3, and is usually around 2. Kaolin-type clays may be considered as sheetlike crystalline silicates, their basic structural unit being an aluminosilicate sheet consisting of a layer of silicon cations, in tetrahedral coordination with oxygen anions, bonded to a layer of aluminum cations in octahedral coordination with oxygen or hydroxyl anions. These sheets are stacked one on top of another to form the small plate-like crystals of the mineral. The various members of the kaolin-type group differ primarily in the way that the basic structural sheets are stacked.

It has been unexpectedly discovered that only the particular combination of kaolin-type clay, lignosulfonate, and molecular sieve is effective in producing significant improvements in crush strengths over the prior art bonded molecular sieves. Such clays as attapulgite and bentonite are used for providing bound agglomerates of molecular sieves having substantially no loss of adsorption capacity. However, when such clays are employed as binders in conjunction with lignosulfonate additions, no significant results are obtained. For example, a sodium lignosulfonate (3.3 wt.-percent) was incorporated with sodium zeolite A powder and a refined attapulgus clay, blended and extruded into ⅛ in. pellets. The product exhibited a considerably reduced oxygen adsorption capacity (16.0 wt.-percent at −183° C. and 100 mm. Hg) and reduced product piece density as compared with a control batch of pellets (oxygen capacity 21.0 wt.-percent) prepared in a similar manner with the same clay but without the addition of the lignosulfonate. Furthermore, the average crush strength of the lignosulfonate batch was not significantly greater than that of the control batch.

In an example of the invention, 1543 grams of sodium zeolite X powder at 41% $H_2O$, wet basis (908 grams, dry) and 228 grams of a kaolin type clay were placed in a muller mixer and mulled for about 15 minutes. Then 35 grams of a sodium lignosulfonate dissolved in a small amount of water was added to the mulling mix. Additional amounts of water were added to the mulling mix from time to time. After about 20 minutes of mixing, an air blast was directed into the mulling mix to dry the mixture to an extrudable consistency. One hour after the air blast was directed on the mixture, mulling was stopped. Since the mixture was found too dry to extrude, sufficient water was added to the mix and mulled in to make the mix extrudable. The final moisture of the mix was 40.6%, wet basis. This mix was then passed through an extruder having a die plate with openings of about ⅛ of an inch in size. The extrusions were dried at 100° C. in a circulating air dryer and activated (fired) at 625° C. in a small indirect fired rotary kiln for about 15 minutes. The product had the following properties:

Average crush strength, activated (25 pellets) __lb__ 39.2
Average crush strength, hydrated (10 pellets) __lb__ 14.0
Pellet piece density _____lb./ft.³__ 65.0
$O_2$ adsorption, 100 mm., −183° C. __wt.-percent__ 24.3
$CO_2$ adsorption, 250 mm., R.T. _____wt.-percent__ 17.4

In another example of the process of the invention a mix was prepared having the following composition:

Grams
Sodium zeolite A powder (25% $H_2O$ content) ___ 6800
Kaolin clay _____ 958
Lignosulfonate _____ 322

This mix was blended dry for 30 minutes and then mixed in an intensive sigma blade mixer for three hours with about 2500 cc. of water. The mix was extruded through a ⅛-in. die with good results. The resulting pellets were fired (activated) in a small rotary kiln at 650° C., using a dry air purge. In the Monsanto hardness test, values of 12.9 and 13.2 kg. were obtained. Standard products usually exhibit Monsanto hardness test values of around 8–10 kg. Adsorption of $CO_2$ at 25° C. and 250 mm. Hg was 14.0 wt.-percent, compared to 13.0–14.0 wt.-percent for standard products prepared under the same conditions, but without lignosulfonate additive.

Lignosulfonate additions to the mix are equally useful whether the molecular sieve to be bonded is synthetic or naturally occurring. For example, ⅛-in. pellets extruded from a mix containing natural chabazite, clay and 3 wt.-percent lignosulfonate exhibited crush strengths exceeding 40 lbs.

In the following tables, several tests were employed to show the properties of the products of this invention. These tests are described below.

Steamed pellet capacity

The material being tested was exposed to steam at 350° C. for a period of 24 hours. The effect of steaming was determined by measuring the equilibrium capacity of the material for $O_2$ at $-183°$ C. and 100 mm. Hg before steaming and the same capacity of the material after steaming.

Penny attrition test

This test is an adaptation of Military Specification Test MIL–D 3716 (4.8.4.1-apparatus). One hundred fifty grams of pellets are placed in an apparatus consisting of a shaker and a covered pan with a screen separating the sample from the dust formed by the shaking. Five copper discs (of the size and weight of 1-cent pieces) are included with the sample. After shaking for 15 minutes at 285 r.p.m. the percent loss is calculated by weighing the particles that pass through the screen.

Crush strength test

The apparatus used for this test is a modified spring tester on which the pellet is compressed against an anvil located on a spring-supported platen by a second movable platen. The crushing load, in pounds, is indicated directly on a dial scale built into the tester. The pellets are crushed on a diameter across a narrow anvil so that the length of the pellet crushed is constant. Pellets ⅛-inch diameter are crushed on a ¼-inch wide anvil; pellets ¹⁄₁₆-inch diameter are crushed on a ⅛-inch wide anvil. The anvil is supported on rollers on its platen to prevent any lateral or rolling motion from being imparted to the pellet.

Monsanto Hardness Test

The Monsanto Hardness Test consists of fixed- and spring-loaded anvils between which the pellet is crushed. The compressive load (crushing force) is applied by compressing a calibrated spring which in turn forces the spring-loaded anvil against the pellet being crushed. The crushing load applied is read on a scale built into the unit. In the test procedure employed herein, the pellets were crushed across a diameter and the length of the pellet being crushed was always equal to or greater than the width (diameter) of the crushing anvil.

Table I shows some of the physical characteristics of calcium zeolite A, identified in U.S. Patent 2,882,243, wherein the zeolite is unbonded, bonded with a kaolin type clay, and bonded with a kaolin-type clay and lignosulfonates. These results demonstrate clearly the advantages of using a lignosulfonate additive. The crush strength of zeolite A bonded with a kaolin-type clay and lignosulfonate is at least twice that of the strength of zeolite A bonded with clay alone. It is also clear from the data that lignosulfonates used in the proper proportions will not interfere with the adsorption capacity of the molecular sieve. Not only is the pellet strength increased without a sacrifice of adsorption capacity when the lignosulfonate is added, but significant improvements in steam stability and attrition resistance are also shown by the data for zeolite A.

TABLE I.—LIGNOSULFONATE STRENGTHENED CALCIUM ZEOLITE A, KAOLIN CLAY-BONDED PELLETS

| Binder composition [1] | Pellet diam., in. | Avg. crush strength [2] Act., lb. | Piece density Act., lb./ft.³ | Adsorption capacity, wt.-percent $O_2$ ($-183°$ C. 100 mm.) | 24-hour steamed pellet cap., wt.-percent $O_2$ ($-183°$ C. 100 mm.) | Percent cap. loss | Penny attrition loss, wt.-percent |
|---|---|---|---|---|---|---|---|
| 2.9% Orzan S, plus 19.4% Avery Clay | ⅛ | 35 | 66 | 22.1 | | | |
| 20% Avery Clay | ⅛ | 14 | 62 | 22.6 | | | |
| Unbonded calcium zeolite A powder | | | | 27.7 | | | |
| 2.9% Orzan S, plus 19.4% Avery Clay | ⅛ | 50–60 | 74 | 21.8 | 18.8 | 14 | 0.07 |
| 20% Avery Clay | ⅛ | 12 | 70 | 21.3 | 13.7 | 36 | 0.17 |
| 20% Avery Clay | ¹⁄₁₆ | 6 | 70 | 22.1 | | | |

[1] Balance Calcium zeolite A. Activated basis.
[2] ⅛ in. pellets crushed on diameter across ¼ in. wide anvil. ¹⁄₁₆ in. pellets crushed on diameter across ⅛ in. wide anvil. Anvil supported on rollers to prevent premature breaking of curved pellets in all data except low values for production Orzan S Run.

Table II shows some of the physical characteristics of sodium zeolite X identified in U.S. Patent 2,882,244, wherein the zeolite is unbonded, bonded with clay, and bonded with clay and lignosulfonates. It is clear from this data that lignosulfonates added to kaolin clay and zeolite X result in stronger pellets without sacrificing adsorption properties. Crush strengths of the lignosulfonate-containing pellets are increased two to four times that of the kaolin clay zeolite X product without lignosulfonate.

TABLE II.—LIGNOSULFONATE STRENGTHENED SODIUM ZEOLITE X KAOLIN CLAY-BONDED PELLETS

| Binder composition [a] | Pellet diam. in. | Avg. crush strength [b] | | Piece density, act, lb./ft.³ | Adsorption capacity, wt.-percent | | Penny attrition loss, wt.-percent |
| | | Act., lb. | Hyd., lb. | | $CO_2$ (25°C. 250 mm.) | $O_2$ ($-$183° C. 100 mm.) | |
|---|---|---|---|---|---|---|---|
| 2.9% Orzan S plus 19.4% Avery Clay | ⅛ | 27 | | 60 | 17.5 | | |
| 20% Avery Clay | ⅛ | 9 | | 57 | 16.8 | | |
| 2.9% Orzan S plus 19.4% Avery Clay | ⅛ | 39 | 14 | 65 | 17.4 | 24.3 | |
| 20% Avery Clay | ⅛ | 10 | 6 | 59 | 17.2 | 25.0 | |
| Unbonded zeolite X powder | | | | | 23.4 | | |
| Unbonded zeolite X powder | | | | | 21.3 | | |
| 2.9% Orzan S plus 19.4% Avery Clay | ⅛ | 24 | | 64 | 17.2 | 25.4 | 0.06 |
| | ¹⁄₁₆ | 17 | | 64 | | 24.7 | |
| 20% Avery Clay | ⅛ | 13 | | 63 | | 24.1 | 0.12 |
| 20% Avery Clay | ¹⁄₁₆ | 7 | | 61 | | 25.4 | |

[a] Balance sodium zeolite X powder.
[b] ⅛ in. pellets crushed on a diameter across a ¼ in. wide anvil. ¹⁄₁₆ in. pellets crushed on a diameter across a ⅛ in. wide anvil. Anvil supported on rollers to prevent premature breaking of curved pellets.

Table III shows the results of tests to check both dried and activated pellets of the present invention for ignition and explosion in oxygen atmosphere. In all tests, there was no ignition or explosion of any of the products including the dried pellets. Thus, there should be no danger in using agglomerates strengthened with lignosulfonates, in the concentrations specified, in oxidizing atmospheres.

TABLE III.—CARBON ANALYSES AND COMBUSTION TESTS FOR LIGNOSULFONATE STRENGTHENED PELLETS OF ZEOLITES A AND X

| Zeolite | Pellet diam. in. | Condition | Test | Results |
|---|---|---|---|---|
| Calcium Zeolite A | ⅛ | Dried | Bomb | No explosion to 500° C. at 2,340 p.s.i. $O_2$. |
|  |  |  | Impact | No explosion at 114 ft. lb. |
|  |  |  | Calorimeter | No ignition. |
| Calcium Zeolite A | ⅛ | Fired | Bomb | No explosion to 500° C. at 2,600 p.s.i. $O_2$. |
|  |  |  | Impact | No explosion at 114 ft. lb. |
|  |  |  | Calorimeter | No ignition. |
| Calcium Zeolite A | 1/16 | Fired | Bomb | No explosion to 500° C. at 2,625 p.s.i. $O_2$. |
|  |  |  | Impact | No explosion at 114 ft. lb. |
|  |  |  | Calorimeter | No ignition. |
| Sodium Zeolite X | ⅛ | Fired | Bomb | No explosion to 503° C. at 2,575 p.s.i. $O_2$. |
|  |  |  | Impact | No explosion at 114 ft. lb. |
|  |  |  | Calorimeter | No ignition. |

Lignosulfonate strengthened sodium zeolite X ⅛ in. pellets analyzed 0.056 wt-percent carbon.
The sodium zeolite X ⅛ in. std. pellets analyzed 0.025 wt-percent carbon.
Lignosulfonate strengthened calcium zeolite A ⅛ in. and 1/16 in. pellets analyzed 0.04 wt-percent carbon residue.

It has been discovered that the lignosulfonates serve as dispersants and extrusion aids as well as greatly improving the crush strength of the kaolin-type clay bonded molecular sieve. This is shown by the generally higher density of the lignosulfonate-strengthened pellets and the lower moisture required in an extrusion mix.

What is claimed is:

1. An agglomerate having been formed from a mixture of crystals of a crystalline zeolitic molecular sieve, a kaolin type clay and lignosulfonate; said kaolin type clay comprising between 1 percent and 40 percent by weight of said mixture, said lignosulfonate comprising between about 2 percent and 5 percent by weight of said mixture, said agglomerate having been formed from said mixture into a mass and fired at a temperature sufficiently high to dry said kaolin type clay, provide a bound product, and activate said crystalline zeolitic molecular sieve, the firing temperature being below the temperature at which said crystalline zeolitic molecular sieve is structurally unstable.

2. An agglomerate having been formed from a mixture of crystals of a crystalline zeolitic molecular sieve, a kaolin type clay and lignosulfonate; said kaolin type clay comprising from about 10 percent to about 25 percent by weight of said mixture, said lignosulfonate comprising between about 2 percent and 5 percent by weight of said mixture, said agglomerate having been formed from said mixture into a mass and fired at a temperature such that said clay passes through an irreversible phase change, said firing temperature being below that temperature at which said crystalline zeolitic molecular sieve is structurally unstable.

3. An agglomerate as described in claim 2 wherein said crystalline zeolitic molecular sieve is zeolite A and the firing temperature of said clay is above about 600° C.

4. An agglomerate as described in claim 2 wherein said crystalline zeolitic molecular sieve is zeolite X and the firing temperature of said clay is above about 600° C.

5. An adsorbent pellet having been formed from a substantially uniform mixture of crystalline zeolitic molecular sieve, a kaolin type clay, and lignosulfonate, said kaolin type clay comprising from about 10 percent to about 25 percent by weight of said mixture, said lignosulfonate comprising from about 2 percent to about 5 percent by weight of said mixture, and said pellet having been formed from said mixture into a substantially cylindrical shape and fired below that temperature at which said crystalline zeolitic molecular sieve is structurally unstable and above about 600° C.

6. An adsorbent pellet in accordance with claim 5 which comprises about 20 percent kaolin clay and about 3 percent lignosulfonate, the remainder being the molecular sieve.

7. An adsorbent pellets as described in claim 6 wherein said crystalline zeolitic molecular sieve is zeolite A.

8. An adsorbent pellet as described in claim 6 wherein said crystalline zeolitic molecular sieve is zeolite X.

9. A process for producing an agglomerate of a crystalline zeolitic molecular sieve which process comprises blending said molecular sieve, a kaolin type clay, lignosulfonate and moisture, said kaolin type clay comprising from about 1 to about 40 weight percent based on the total weight of zeolitic molecular sieve, kaolin type clay and lignosulfonate, and said lignosulfonate comprising from about 2 to about 5 weight percent based on the total weight of kaolin type clay, zeolitic molecular sieve, and lignosulfonate, compacting and drying said blended materials, and firing said blended materials at a temperature sufficiently high to dry said kaolin type clay, provide a bound product, and activate said crystalline zeolitic molecular sieve, the firing temperature being below that temperature at which said crystalline zeolitic molecular sieve is structurally unstable.

10. A process as described in claim 9, wherein said firing temperature is above about 600° C.

11. A process for producing pellets of a crystalline zeolitic molecular sieve which process comprises blending said molecular sieve, a kaolin-type clay, a lignosulfonate and moisture, said kaolin type clay comprising from about 1 to about 40 weight percent based on the total weight of zeolitic molecular sieve, kaolin type clay and lignosulfonate, and said lignosulfonate comprising from about 2 to about 5 weight percent based on the total weight of kaolin type clay, zeolitic molecular sieve, and lignosulfonate, extruding such blended materials into discrete pellets, and firing said pellets at a temperature sufficiently high to dry said clay, provide a bound pellet, and activate said crystalline zeolitic molecular sieve, the firing temperature being below that temperature at which said crystalline zeolitic molecular sieve is structurally unstable.

12. A process as described in claim 11 wherein said firing temperature is above about 600° C.

References Cited by the Examiner

UNITED STATES PATENTS

| | | | |
|---|---|---|---|
| 1,069,031 | 7/1913 | Robeson | 106—38.2 |
| 1,501,975 | 7/1924 | Strehlenert | 106—123 |
| 2,973,327 | 2/1961 | Mitchell | 252—449 |
| 3,044,140 | 7/1962 | Coxey | 106—123 X |

MAURICE A. BRINDISI, *Primary Examiner.*